US006091775A

United States Patent [19]
Hibi et al.

[11] Patent Number: 6,091,775
[45] Date of Patent: Jul. 18, 2000

[54] VIDEO-CODING DEVICE AND VIDEO-DECODING DEVICE

[75] Inventors: Keiichi Hibi, Matsudo; Seiji Sato, Toride, both of Japan

[73] Assignee: Sharp Kabushiki Kaisha, Osaka, Japan

[21] Appl. No.: 09/057,497

[22] Filed: Apr. 9, 1998

[30] Foreign Application Priority Data

Apr. 17, 1997 [JP] Japan .................................. 9-100112
Aug. 27, 1997 [JP] Japan .................................. 9-231421

[51] Int. Cl.$^7$ ...................................... H04N 1/41
[52] U.S. Cl. .......................... 375/240; 348/408; 348/397; 348/398
[58] Field of Search .................................. 348/397, 398, 348/408, 384, 390, 400, 401, 402, 409, 415, 416; 382/232, 233, 236, 238

[56] References Cited

U.S. PATENT DOCUMENTS

| | | | |
|---|---|---|---|
| 5,508,746 | 4/1996 | Iizuka ...................................... | 348/415 |
| 5,528,284 | 6/1996 | Iwami et al. .............................. | 348/13 |
| 5,613,146 | 3/1997 | Gove et al. ............................... | 712/20 |
| 5,623,312 | 4/1997 | Yan et al. ................................. | 348/416 |
| 5,659,363 | 8/1997 | Wilkinson ............................... | 348/398 |
| 5,666,162 | 9/1997 | Iizuka ...................................... | 348/415 |
| 5,680,322 | 10/1997 | Shinoda ................................... | 714/18 |
| 5,867,602 | 2/1999 | Zandi et al. .............................. | 382/248 |

FOREIGN PATENT DOCUMENTS

| | | |
|---|---|---|
| 0 762 773 A2 | 3/1997 | European Pat. Off. . |
| 9-70047 | 3/1997 | Japan . |

OTHER PUBLICATIONS

Steinbach, et al, "Standard Compatible Extension of H.263 for Robust Video Transmission in Mobile Environments", IEEE Transactions on Circuits and Systems for Video Technology, vol. 7, No. 6, Dec. 1997, pp. 872–881.

Primary Examiner—Chris S. Kelley
Assistant Examiner—Ly Duy Pham
Attorney, Agent, or Firm—Nixon & Vanderhye, P.C.

[57] ABSTRACT

A video-coding device and a video-decoding device, which are capable of assuring the necessary quality of a video sequence even if a transmission error and/or a loss of information occurs in a transmission line and preventing the propagation of decoding error to subsequent images, and can effectively retransmit the necessary coded information when a transmission error and/or a loss of information occurs in a transmission line. A motion-compensated interframe-predicting portion predicts an input image by using a preceding decoded image stored in a frame memory portion and outputs motion vectors. A difference calculating portion determines a difference between the input image signal and the predicted image signal and outputs the difference as a prediction-error signal to a band-dividing portion which in turn divides the prediction-error signal into n hierarchical layers of frequency-band-components and outputs them to respective coding portions. A loop-back control portion decides whether each of the coded frequency-band-components of the coded prediction-error signal from respective coding portions is input to a synthesizing portion and outputs a decoded prediction-error signal. The predicted image signal and the decoded prediction-error signal are combined to generate a decoded image signal corresponding to the input image. The decoded image signal is used for prediction of a subsequent input image. A motion-compensated interframe-predicting portion predicts an input image by using a preceding decoded image stored in a frame memory portion and outputs motion vectors. A difference calculating portion determines a difference between the input image signal and the predicted image signal and outputs the difference as a prediction-error signal to a band-dividing portion which in turn divides the prediction-error signal into n hierarchical layers of frequency-band-components and outputs them to respective coding portions for quantizing and encoding the respective components. Buffer portions store the coded information and output the information to an external circuit. The buffers output respective frequency-band-components of the coded information according to retransmission request signals from a retransmission control portion.

10 Claims, 12 Drawing Sheets

OTHER PUBLICATIONS

Patent Abstracts of Japan, vol. 096, No. 004, Apr. 30, 1996 & JP 07 322248 A (Matsushita Electric Ind Co Ltd), Dec. 8, 1995.

"Subband Coding Algorithms for Video Applications: Videophone to HDTV–Conferencing", Gharavi, IEEE Transactions on Circuits and Systems for Video Technology, vol. 1, No. 2, Jun. 1991, pp. 174–183.

"Transmission of Subband–Coded Images via Mobile Channels", Stedman et al, IEEE Transactions on Circuits and Systems for Video Technology, vol. 3, No.1, Feb. 1993, pp.15–26.

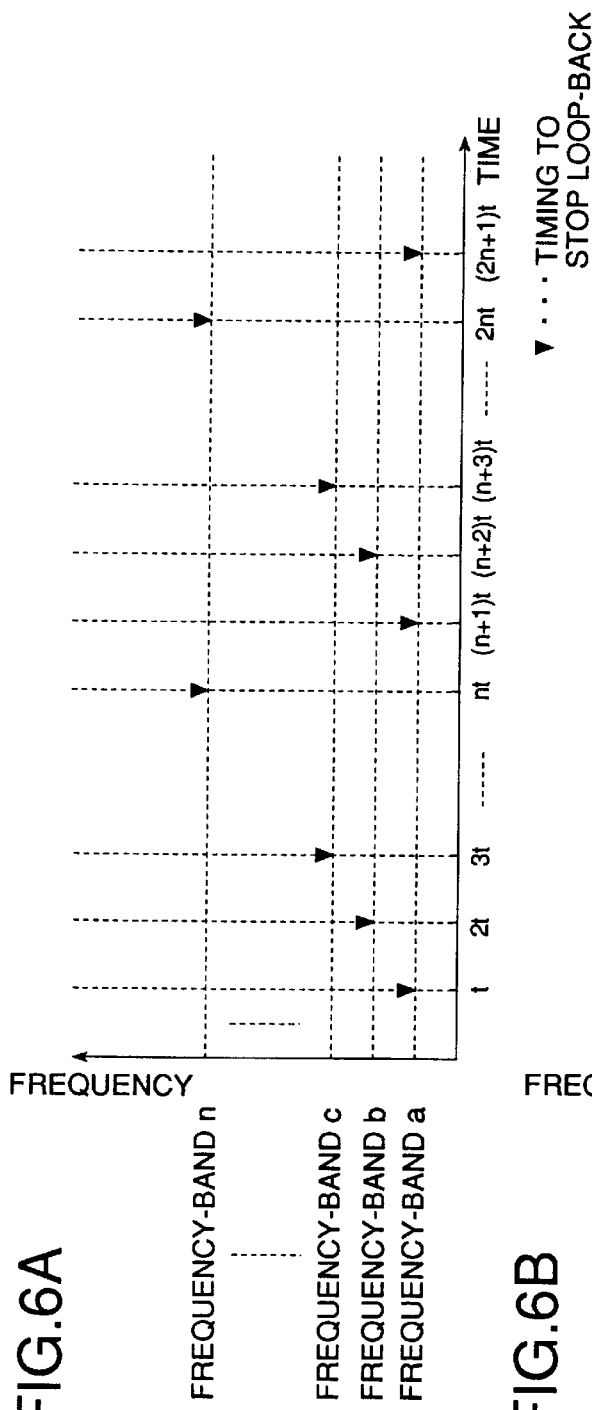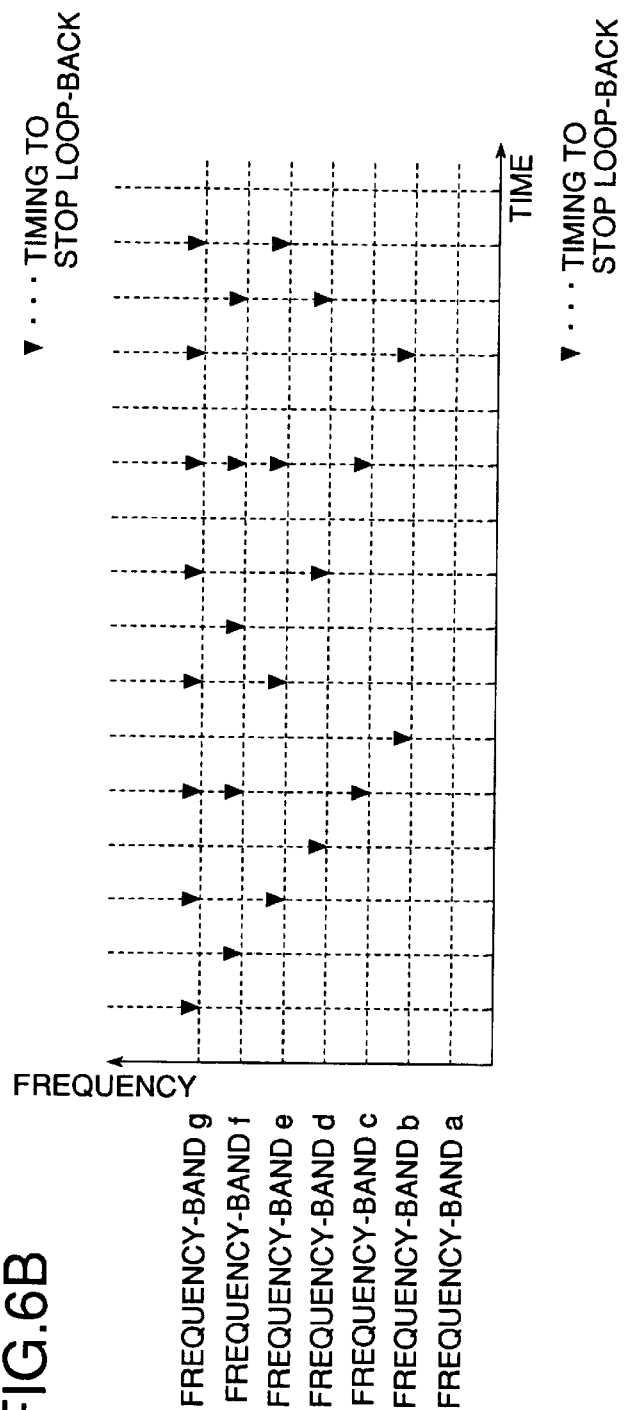

VIDEO-CODING DEVICE AND VIDEO-DECODING DEVICE

BACKGROUND OF THE INVENTION

The present invention relates to a video coding device for compressively encoding a video signal by reducing redundant data contained therein and a video decoding device for decoding the compressed coded video signal and, more particularly, relates to a video coding device for hierarchically encoding a video sequence by previously performing motion-compensated interframe prediction of video frames, dividing an obtained prediction error signal into frequency-band-components and separately encoding each of the frequency-band-components and a video decoding device for decoding video signals coded by the video coding device.

With recent developments of multimedia services, the image processing technique gets an increasing importance and various kinds of studies concerning to the image processing have been made in various fields of applications.

In general, video information contains a very large amount of information. Accordingly, it is impossible to practically transmit video information as it is, because of necessity of a transmission line with a very wide-band transmission capacity. On the other hand, a video signal contains redundancy to be reduced. Therefore, a method for encoding a video sequence by reducing redundant data contained therein is widely applied as a compression coding technique to treat video signals at high efficiency.

There's an exemplified structure of a prior art video coding device using an interframe-prediction orthogonal-transform coding method. In the prior art video coding device a motion-compensated interframe-predicting portion encodes input video signals per frame by motion-compensated interframe-predicting method and outputs motion-vectors. Namely, a preceding video frame image which has been coded, decoded and then stored in a frame memory portion is read by the motion-compensated interframe-predicting portion as a predicted video signal. A difference calculating portion determines a prediction error signal that is a difference between the input video signal and the predicted video signal read from the frame memory portion, thus eliminating temporal redundancy from the signal to be encoded.

The prediction error signal outputted from the difference calculating portion is transferred to an orthogonal transforming portion whereby the signal is orthogonally transformed and removed off spatial redundancy. In consequence of this processing, a transform coefficient is outputted.

The transform coefficient from the orthogonal transforming portion is quantized and encoded with a compressed amount of information by a coding portion.

The output signal from the coding portion is transferred as coded information to an external circuit and a decoding portion.

The decoding portion performs processing operations reverse to those performed by the coding portion and outputs the transform coefficient to an inverse orthogonal transforming portion that in turn conducts inverse orthogonal transform of the received transform coefficient.

The output signal from the inverse orthogonal transforming portion is added by an adding portion to the predicted video signal read from the frame memory portion. The resultant signal is stored in the frame memory portion and will be used for interframe prediction of a next input video signal. Generally, this operation is called "Loop-back".

Input video signals are thus encoded by a coding-decoding loop configuration (coding loop).

As described above, the prior art video coding device is capable of efficiently encoding video sequence by previously eliminating temporal redundancy of image information through motion-compensated prediction and spatial redundancy through orthogonal transform.

However, the prior art coding method encodes a video sequence frame by frame and, therefore, a whole image may not correctly be decoded from image information encoded by the conventional coding method if any image signal should have a transmission error or loss of information, which occurred in a transmission line.

Furthermore, the prior art method uses the interframe prediction coding technique and therefore involves a problem of handing down an incorrectness occurred in a decoded image to all subsequent frames to be encoded.

To solve the above-mentioned problems, Japanese Laid-Open Patent Publication No. 9-70047 discloses a hierarchical coding method that arranges image signals in a hierarchy and encodes signals of each hierarchical layer separately from each other. Namely, when incorrect decoding occurred in a hierarchical layer of image signals, this method can minimize the impairment of decoded images by only recoding signals of other correct layers.

There's illustrates an exemplified construction of a hierarchical video coding device using divided frequency bands. Similarly to the above-described prior art method, the device encodes an input video-sequence frame by frame by a motion-compensated interframe-predicting portion and outputs a prediction error signal per frame from a difference calculating portion.

The prediction-error signal from the difference calculating portion is divided into a plurality of frequency bands and then outputted in bands respectively by a band-dividing portion. The band-components of the prediction error signal, which were outputted from the band-dividing portion, are encoded separately from one another by the coding portions respectively. Encoded information a–n is outputted to an external circuit and corresponding decoding portions.

The decoding portions performs processing operations reverse to those performed by the coding portions from which respective band components of the prediction-error signal are outputted.

On the other hand, a predicted image signal read from a frame memory is divided into frequency bands and outputted as respective frequency-band-components by a band dividing portion.

The frequency-band-components of the predicted image signal from the band dividing portion are added to the corresponding frequency-band-components of the prediction-error signal from the decoding portions by an adding portions respectively. The obtained frequency-band-components of a decoded image signal are outputted respectively.

These frequency-band-components of the decoded image signal are synthesized by a synthesizing portion to form a decoded image signal through processing operations reverse to those performed by the band dividing portion. The decoded image signal is stored in the frame memory portion and will be used for interframe prediction of a next input image signal. According to the above-mentioned processing method, it is possible to minimize degradation of a video sequence due to an error or a loss in information transmitted over a transmission line since a decoding error occurred in a certain frequency-band-component may be confined in said frequency band.

However, when transmission error and/or a loss of information occurs in a transmission line, the above-mentioned prior art hierarchical coding device can enclose the decoding error within a hierarchical layer but cannot completely prevent said error from propagating to subsequent images.

SUMMARY OF THE INVENTION

In view of the foregoing problems involved in the prior arts, the present invention is made to provide a video-coding device and a video-decoding device, which are capable of assuring the necessary quality of a video sequence even if a transmission error and/or a loss of information occurs in a transmission line and preventing the propagation of decoding error to subsequent images, and further provide a video-coding device and a video-decoding device, which can effectively retransmit necessary coded information if a transmission error and/or a loss of information occurs in a transmission line.

(1) An object of the present invention is to provide a video coding device provided with hierarchically encoding a video image sequence, which obtains a prediction error signal between an object input image and a predicted image obtained through performing motion-compensated interframe-prediction of digital video image signals, divides the obtained prediction-error signal into predetermined frequency-band-components, encodes each of the frequency-band-components, outputs the coded signal to be transmitted and, at the same time, generates a decoded image frame from coded prediction-error signals obtained by decoding the coded prediction-error signals of the frequency-band components and the predicted image frame and conducts loop-back of the generated decoded image frame to be used for motion-compensated interframe prediction of a subsequent image frame, wherein the loop-back conducting means is provided with a hierarchical loop-back control means for separately selecting execution or non-execution of loop-back for each of the frequency-band components, thus effectively preventing propagation of any decoding error to a subsequent image frame.

(2) Another object of the present invention is to provide a video coding device as mentioned of (1) above, wherein the hierarchical loop-back control means independently controls the loop-back mode for each of the frequency-band-components, thus making it possible to effectively do loop-back of necessary frequency bands only.

(3) Another object of the present invention is to provide a video coding device as mentioned of (1) or (2) above, wherein the hierarchical loop-back control means periodically changes frequency-band-components not to be looped-back one another for evenly looping-back every frequency band, thus preventing propagation of an unpredictable decoding error to a subsequent decodable image. Namely, any decoding error occurred in any frequency-band can be periodically prevented from propagating to a subsequent image frame.

(4) A further object of the present invention is to provide a video coding device as mentioned of any one of (1) to (3) above, wherein the hierarchical loop-back control means adaptively changes a loop-back rate for each of the frequency bands in such a way that a lower frequency band is looped back at a higher rate while a higher frequency band is looped back at a lower rate.

(5) Another object of the present invention is to provide a video decoding device for decoding coded signals by a hierarchical coding method, which obtains a decoded prediction-error by decoding coded prediction-error signals of predetermined frequency-band components, said coded prediction-error signals obtained by obtaining a prediction-error signal through performing motion-compensated interframe-prediction, dividing the prediction-error signal into predetermined frequency-band-components and encoding the frequency-band-components, obtains decoded prediction-side-information by decoding coded-prediction-side-information on the motion-compensated interframe-prediction, generates a decoded image frame from the prediction side information and a reference predicted image frame and generates a decoded video image signal from the decoded predicted image frame and the coded prediction-error signals and which device is featured by that a hierarchical loop-back means for obtaining the reference predicted-image-frame used for obtaining the decoded predicted-image-frame and is capable of individually selecting execution or non-execution of looping-back for each of the frequency-band components.

(6) A further object of the present invention is to provide a video decoding device as mentioned of (5) above, wherein the hierarchical loop-back means is capable of individually selecting execution or non-execution of looping-back for each of the frequency-band components according to loop-back control information transmitted from a coding device for decoding coded signals using a hierarchical coding method.

Furthermore, the present invention is directed to a video-coding device provided with a hierarchical retransmission-control means, which obtains a prediction-error signal between a codable input image and a predicted image obtained through performing motion-compensated interframe-prediction of digital video signals, divides the obtained prediction-error signal into several frequency-band-components, encodes the frequency-band-components respectively and switching either to do or not to do the retransmission of the obtained coded information either to do or not for each of the frequency-band components.

And, the device can individually control changing-over of the retransmission of the coded information for each frequency component.

The present invention is also directed to a video-decoding device provided with a retransmission-request control means, which can decode the coded-information of the frequency components transmitted from the above-mentioned video-coding device and can decide the need of requesting retransmission of the necessary coded information and can separately control sending the request of retransmission for each frequency-band component.

The use of the above-mentioned hierarchical control systems for selectively deciding retransmission request and separately sending requesting command makes it possible to effectively decide the need of retransmission of the coded information for each of the frequency components according to the result of decoding each of the frequency-band components. The separate request control makes it possible to effectively retransmit and receive the coded information of the necessary frequency-component only.

(7) Another of the present invention is to provide a video coding device for obtaining a prediction error signal between an object input image and a predicted image obtained through performing motion-compensated interframe-prediction of digital video signals, dividing the obtained prediction error signal into several frequency-band-components, encoding each of the frequency-band-components and outputting the coded signal to be transmitted, which is provided with hierarchical retransmission-control means for separately deciding and executing retransmission of the coded information for each of the frequency-band components.

(8) A further object of the present invention is to provide a video coding device as mentioned of (7) above, wherein the hierarchical retransmission-control means independently controls the retransmission for each of the frequency-band-components.

(9) Another object of the present invention is to provide a video decoding device which decodes coded prediction-error signals of predetermined frequency-band components, said coded prediction-error signals obtained by obtaining a prediction-error signal through performing motion-compensated interframe-prediction, dividing the prediction-error signal into predetermined frequency-band-components and encoding the frequency-band-components, decodes prediction-side-information on the motion-compensated interframe-prediction, and generates a decoded image frame from the decoded prediction-side-information and a reference predicted image frame and then generates a decoded video signal from the decoded predicted image frame and the coded prediction-error signals and which device is provided with retransmission control means for switching either to send or not to send a retransmission request for coded information for each frequency band, including the coded prediction-error of the frequency band.

(10) A further object of the present invention is to provide a video decoding device as mentioned of (9) above, wherein the hierarchical retransmission-request control means can individually control sending a retransmission-request for the coded information for each frequency-band.

BRIEF DESCRIPTION OF DRAWINGS

FIG. 6A is a view for explaining one of the operation of a loop-back control portion of a video coding device provided with hierarchical loop-control means according to the present invention.

FIG. 6B is a view for explaining another one of the operation of a loop-back control portion of a video coding device provided with hierarchical loop-control means according to the present invention.

PREFERRED EMBODIMENTS OF THE INVENTION

The present invention relates to a video coding device for compression encoding a video signal by reducing redundant data contained therein and a video decoding device for decoding the compressed coded video signal and, more particularly, relates to a video coding device for hierarchically encoding a video sequence by previously performing motion-compensated interframe prediction of video frames, dividing an obtained prediction error signal into frequency-band-components and separately encoding each of the frequency-band-components and a video decoding device for decoding video signals coded by the video coding device.

Prior to explaining preferred embodiments of the present invention, prior art hierarchical video-coding device and video-decoding device will be described below as references for the present invention.

With recent developments of multimedia services, the image processing technique gets an increasing importance and various kinds of studies concerning to the image processing have been made in various fields of applications.

In general, video information contains a very large amount of information. Accordingly, it is impossible to practically transmit video information as it is, because of necessity of a transmission line with a very wide-band transmission capacity. On the other hand, a video signal contains redundancy to be reduced. Therefore, a method for encoding a video sequence by reducing redundant data contained therein is widely applied as a compression coding technique to treat video signals at high efficiency.

Figure 1:
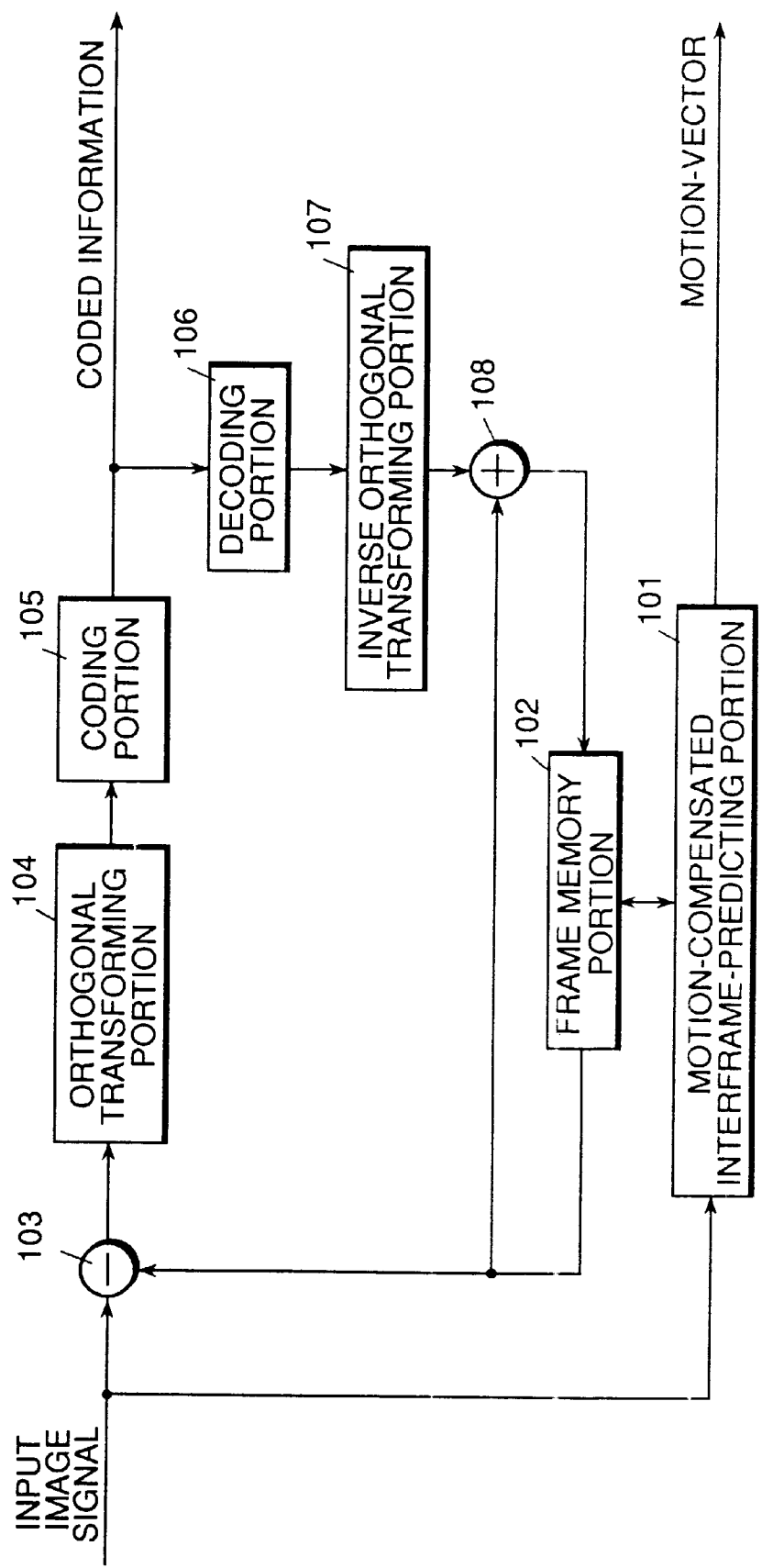
FIG. 1 is a construction block-diagram of a video coding device using a prior art interframe-prediction orthogonal-transform coding method.

FIG. 1 is a block diagram showing an exemplified structure of a prior art video coding device using an interframe-prediction orthogonal-transform coding method. As shown in FIG. 1, a motion-compensated interframe-predicting portion 101 encodes input video signals per frame by motion-compensated interframe-predicting method and outputs motion-vectors. Namely, a preceding video frame image which has been coded, decoded and then stored in a frame memory portion 102 is read by the motion-compensated interframe-predicting portion 101 as a predicted video signal. A difference calculating portion 103 determines a prediction error signal that is a difference between the input video signal and the predicted video signal read from the frame memory portion 103, thus eliminating temporal redundancy from the signal to be encoded.

The prediction error signal outputted from the difference calculating portion 103 is transferred to an orthogonal transforming portion 104 whereby the signal is orthogonally transformed and removed off spatial redundancy. In consequence of this processing, a transform coefficient is outputted.

The transform coefficient from the orthogonal transforming portion 104 is quantized and encoded with a compressed amount of information by a coding portion 105.

The output signal from the coding portion is transferred as coded information to an external circuit and a decoding portion 106.

The decoding portion 106 performs processing operations reverse to those performed by the coding portion 105 and outputs the transform coefficient to an inverse orthogonal transforming portion 107 that in turn conducts inverse orthogonal transform of the received transform coefficient.

The output signal from the inverse orthogonal transforming portion. 107 is added by an adding portion 108 to the predicted video signal read from the frame memory portion 102. The resultant signal is stored in the frame memory portion 102 and will be used for interframe prediction of a next input video signal. Generally, this operation is called "Loop-back".

Input video signals are thus encoded by a coding-decoding loop configuration (coding loop).

As described above, the prior art video coding device is capable of efficiently encoding video sequence by previously eliminating temporal redundancy of image information through motion-compensated prediction and spatial redundancy through orthogonal transform.

However, the prior art coding method encodes a video sequence frame by frame and, therefore, a whole image may not correctly be decoded from image information encoded by the conventional coding method if any image signal should have a transmission error or loss of information, which occurred in a transmission line.

Furthermore, the prior art method uses the interframe prediction coding technique and therefore involves a problem of handing down an incorrectness occurred in a decoded image to all subsequent frames to be encoded.

To solve the above-mentioned problems, Japanese Laid-Open Patent Publication No. 9-70047 discloses a hierarchical coding method that arranges image signals in a hierarchy and encodes signals of each hierarchical layer separately from each other. Namely, when incorrect decoding occurred in a hierarchical layer of image signals, this method can minimize the impairment of decoded images by only decoding signals of other correct layers.

Figure 2:
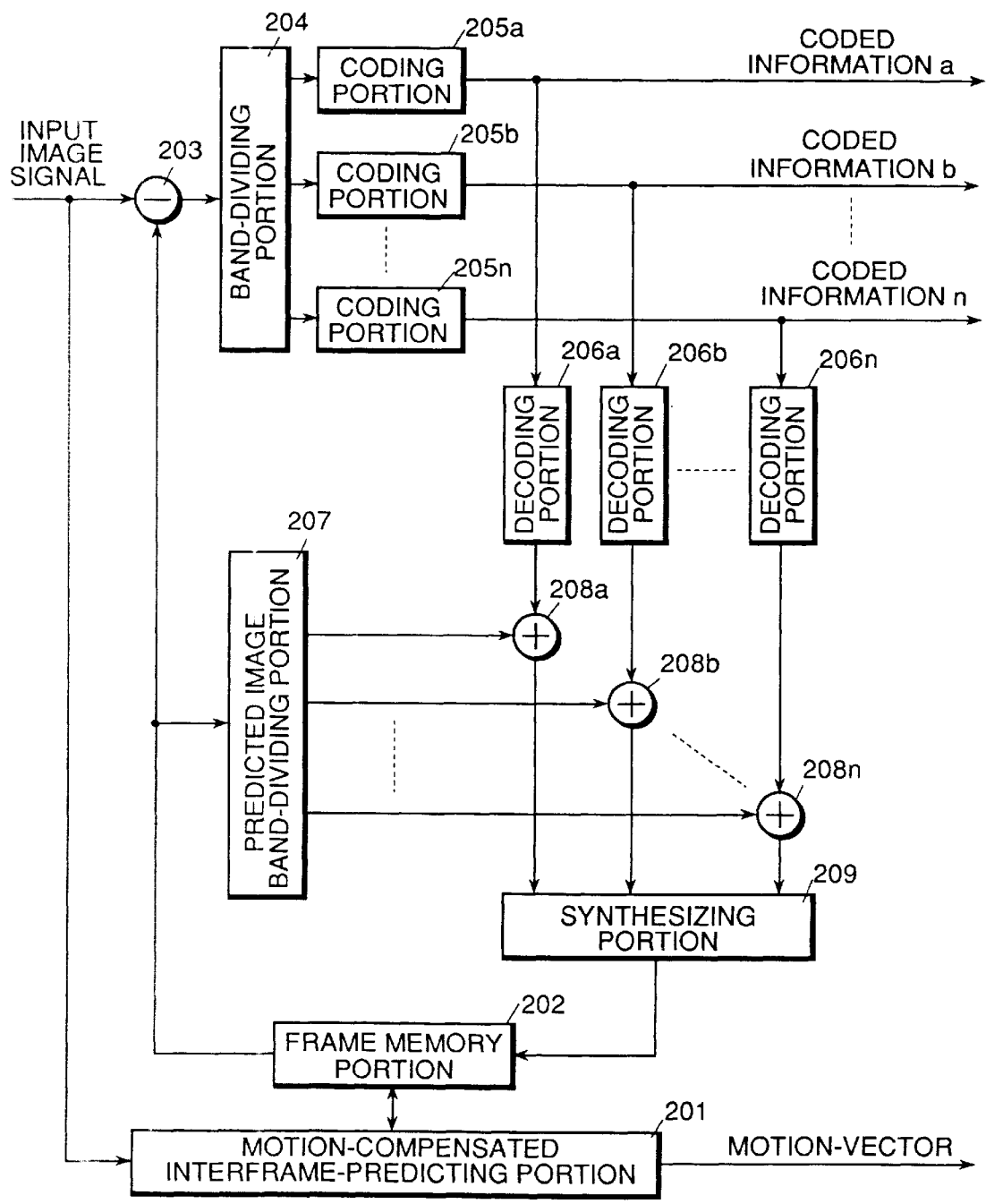
FIG. 2 is a construction block-diagram of a prior art hierarchical video coding device using a frequency band dividing method.

FIG. 2 illustrates an exemplified construction of a hierarchical video coding device using divided frequency bands. Similarly to the above-described prior art method, the device encodes an input video-sequence frame by frame by a motion-compensated interframe-predicting portion 201 and outputs a prediction error signal per frame from a difference calculating portion 203.

The prediction-error signal from the difference calculating portion 203 is divided into a plurality of frequency bands and then outputted in bands respectively by a band-dividing portion 204. The band-components of the prediction error signal, which were outputted from the band-dividing portion 204, are encoded separately from one another by the coding portions 205a–205n respectively. Encoded information a–n is outputted to an external circuit and corresponding decoding portions 206a–206n.

The decoding portions 206a–206n performs processing operations reverse to those performed by the coding portions 205a–205n from which respective band components of the prediction-error signal are outputted.

On the other hand, a predicted image signal read from a frame memory 202 is divided into frequency bands and outputted as respective frequency-band-components by a band dividing portion 207.

The frequency-band-components of the predicted image signal from the band dividing portion 207 are added to the corresponding frequency-band-components of the prediction-error signal from the decoding portions 206a–206n by an adding portions 208a–208n respectively. The obtained frequency-band-components of a decoded image signal are outputted respectively.

These frequency-band-components of the decoded image signal are synthesized by a synthesizing portion 209 to form a decoded image signal through processing operations reverse to those performed by the band dividing portion 207. The decoded image signal is stored in the frame memory portion 202 and will be used for interframe prediction of a next input image signal. According to the above-mentioned processing method, it is possible to minimize degradation of a video sequence due to an error or a loss in information transmitted over a transmission line since a decoding error occurred in a certain frequency-band-component may be confined in said frequency band.

However, when transmission error and/or a loss of information occurs in a transmission line, the above-mentioned prior art hierarchical coding device can enclose the decoding error within a hierarchical layer but cannot completely prevent said error from propagating to subsequent images.

Referring to accompanying drawings, a video-coding device and a video decoding device, which work by hierarchically encoding a video sequence and decoding the hierarchically encoded video-sequence according to the present invention, will be described below in detail.

Figure 3:
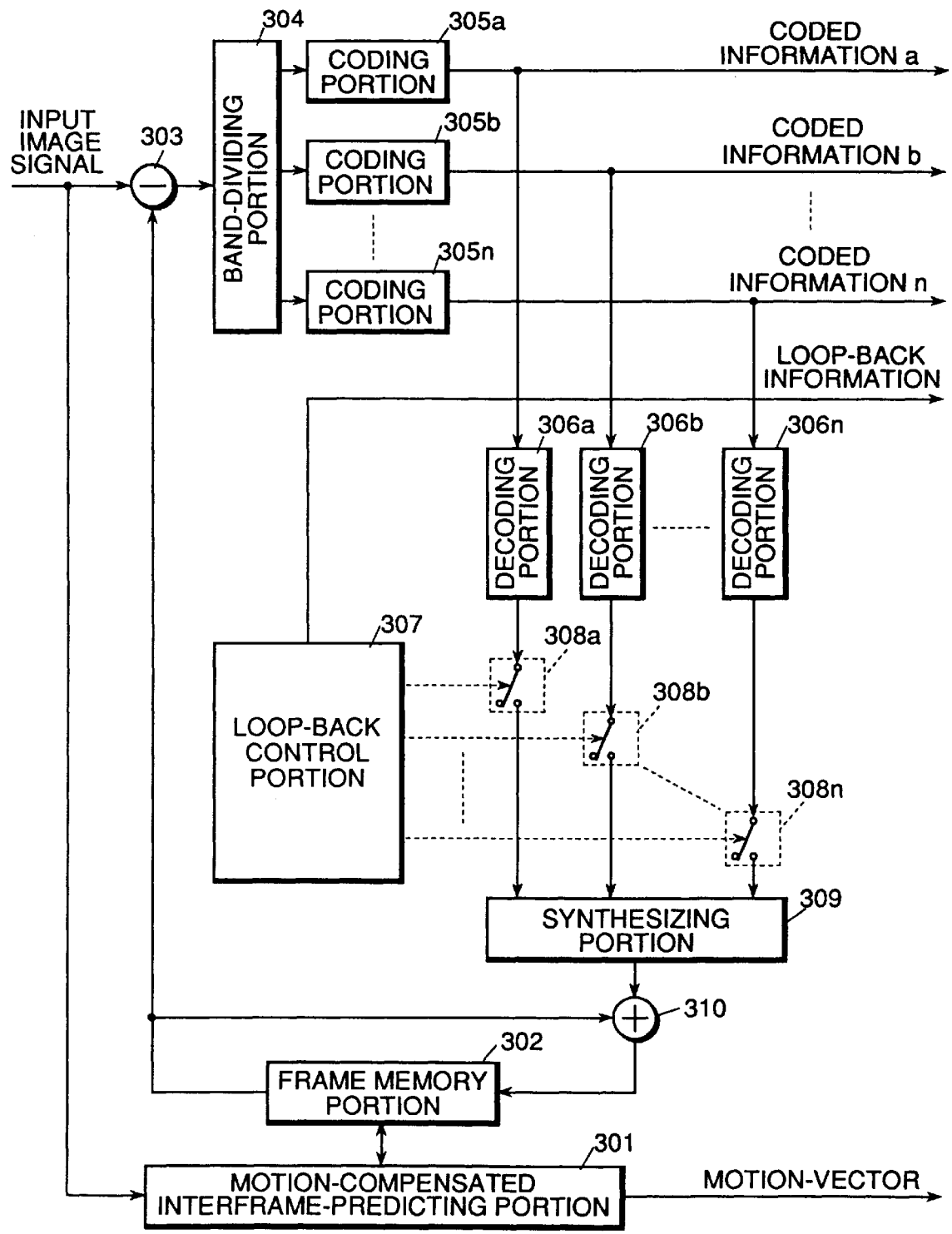
FIG. 3 is a construction block-diagram of a video coding device provided with hierarchical loop-back control means, which device is one embodiment of the present invention.

FIG. 3 depicts a video coding device for hierarchically encoding a video sequence, which is a first embodiment of the present invention.

As shown in FIG. 3, the first embodiment of the present invention comprises a motion-compensated interframe predicting portion 301, a frame memory portion 302, a difference calculating portion 303, a band-dividing portion 304, coding portions 305a to 305n, decoding portions 306a to 306n, a loop-back control portion 307, a loop-back selecting portion 308a–308n, a synthesizing portion 309 and adding portion 310.

The above-mentioned portions of the first embodiment are described below in detail.

The motion-compensated interframe-predicting portion 301 performs motion-compensated prediction of the input image signal by reference to the preceding image signal that was coded, decoded and stored in the frame memory portion 302. This predicting portion 301 outputs motion vectors as a result and reads the predicted image signal from the frame memory portion 302.

The frame memory portion 302 stores a preceding image signal coded and then decoded just before the current input image signal.

The difference calculating portion 303 determines a difference between the input image signal and the predicted image signal read from the frame memory portion 302 and outputs the result as a prediction error signal to the band-dividing portion 304.

The band-dividing portion 304 divides a prediction-error signal output from the difference calculating portion 303 into n pieces of frequency-band-components and outputs the frequency-band-components one by one to corresponding coding portions 305a to 305n.

The coding portions 305a to 305n receive the corresponding frequency-band-components of the predicted-error signal respectively from the band-dividing portion 304, quantize and encode the received frequency-band-components and output coded signals a–n of the respective frequency bands.

The decoding portions 306a to 306n decode the respective coded signals outputted from the coding portions 305a to 305n and output respective decoded frequency-band-component signals of the predicted-error signal.

The loop-back control portion 307 decides a frequency-band (or frequency-bands) to be loop-back controlled and gives a loop-back command to the corresponding one (or portions) of loop-back selecting portions 308a to 308n.

Each of the loop-back selecting portions 308a–308n if received the loop-back command from the loop-back control portion 307 operates to input a decoded prediction-error signal from the corresponding decoding portions 306a–306n to a synthesizing portion 309.

The synthesizing portion 309 synthesizes the frequency-band-components of the decoded prediction-error signal outputted from the loop-back selecting portions and outputs the decoded prediction-error signal.

The adding portion 310 adds respective decoded prediction-error signal output from the synthesizing portion 309 to the prediction image signal read and outputted from the frame memory 302 and outputs a decoded image signal corresponding to the input image signal.

Figure 4:
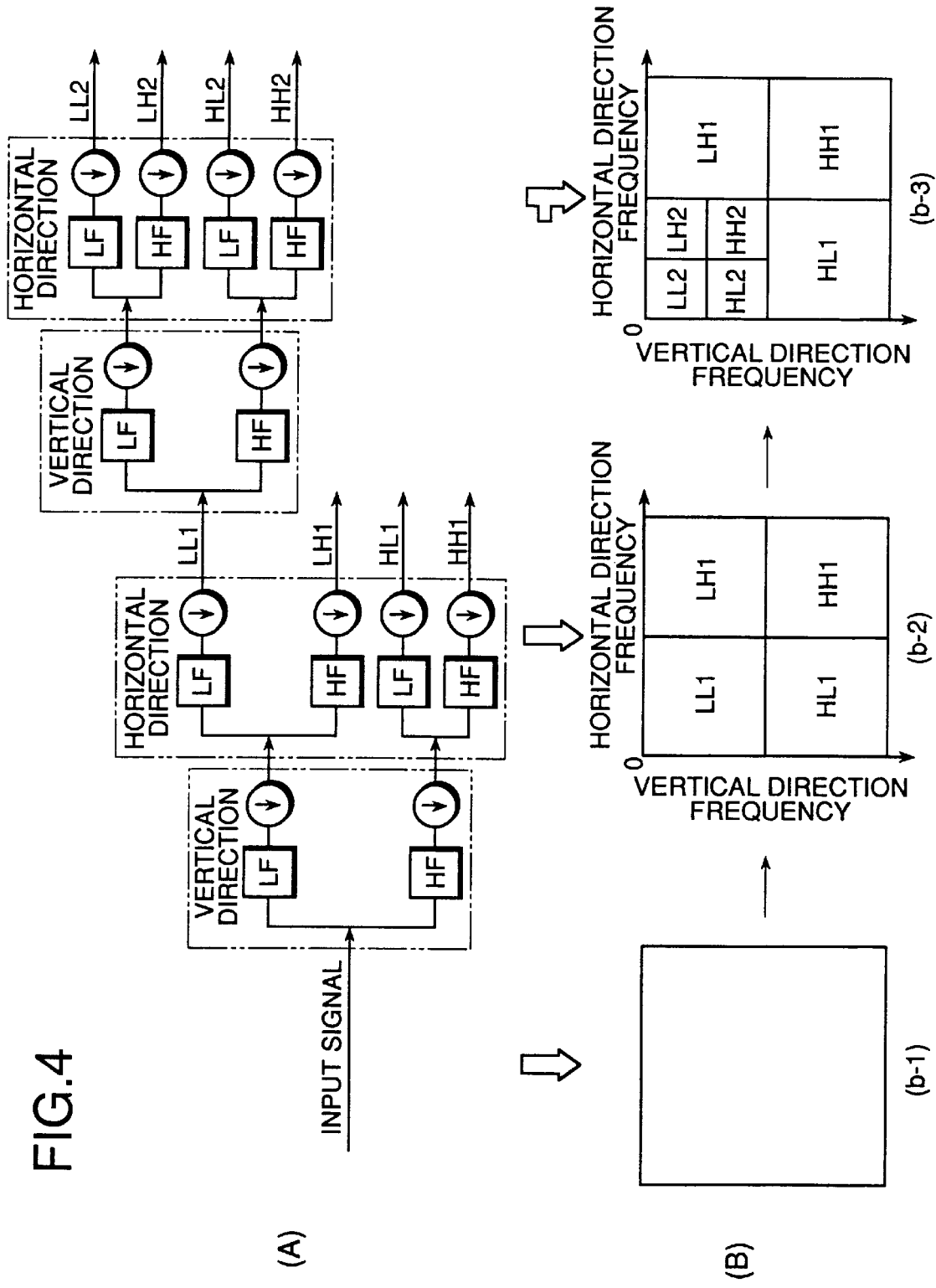
FIG. 4 shows an exemplified structure of a band-dividing portion in the video coding device of FIG. 3 and depicts how to divide an input signal into frequency bands by the band-dividing portion.

FIG. 4 depicts an embodiment of the band-dividing portion 304 of FIG. 3. A part (A) of FIG. 4 shows an example of the circuit construction of the band-dividing portion 304 and a part (B) of FIG. 4 shows a method of dividing a prediction-error signal into frequency-band-components. In the part (A) of FIG. 4, letters LF and HF denote a low-pass filter and high-pass filter respectively.

As shown in the part (B) of FIG. 4, an input signal (b-1) is divided first into 4 frequency bands (b-2), two in the horizontal direction and two in the vertical direction, and the lowest band is similarly divided into 4 bands. Namely, the signal is divided into 7 frequency-bands (b-3). Arrows (⇩) indicate the correlation between the part (A) of FIG. 4 and the part (B) of FIG. 4.

Figure 5:
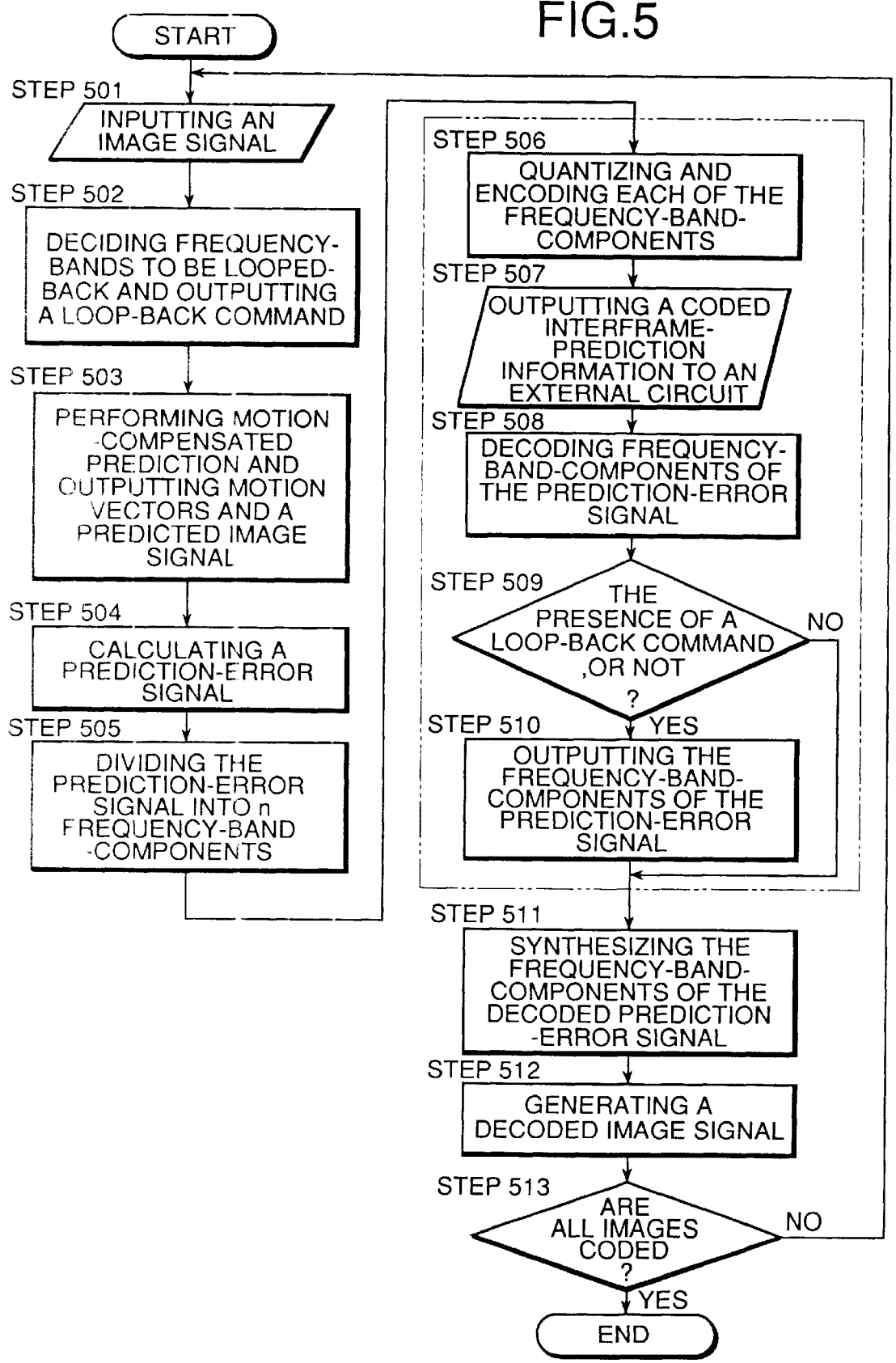
FIG. 5 is a flow chart for explaining a sequence of processing by the video coding device according to the embodiment (FIG. 3) of the present invention.

Referring to FIG. 5, the operation of the video coding device of FIG. 3 according to one aspect of the present invention is described below.

When an image signal is entered (at Step 501), the loop-back control portion 307 decides which coding frequency band to be loop-controlled and outputs a loop-back information indicating which frequency-band is looped back to an external circuit. At the same time, it also outputs a loop-back-command to corresponding loop-back selecting portions (308a to 308n), which correspond to the frequency-bands to be loop-controlled (Step 502).

The motion-compensated predicting portion 301 performs motion-compensated interframe-prediction of the input image signal by reference to a preceding image signal that was coded, decoded and stored in the frame memory portion 302, and outputs motion-vectors to an external circuit, the difference calculating portion 303 and the adding portion 310 respectively (Step 503).

A difference between the input image signal and the predicted image signal read from the frame memory portion 302 is determined by the difference calculating portion 303 and output as a prediction-error signal to the band-dividing portion 304 (Step 504).

This prediction-error signal is divided by the band-dividing portion 304 into n pieces of frequency-band-components that are then transferred to corresponding coding portions 305a to 305n (Step 505).

The coding portions 305a to 305n quantize and encode respective frequency-band-components of the prediction-error, which were outputted from the band-dividing portion 304 (Step 506). The coded components of the prediction-error are outputted to an external circuit (Step 507).

On the other hand, the respective coded information of the frequency-bands outputted from the coding portions 305a to 305n is also transferred to the decoding portions 306a to 306n that in turn decode the received coded information and output the frequency-band-components of the decoded prediction-error signal to the loop-back selecting portions 308a to 308n (Step 508).

The loop-back selecting portions 308a to 308n detect the presence of a loop-back command, or not from the loop-back control portion 307 (Step 509) and transfer the decoded frequency-band-components of the decoded prediction-error signal from the decoding portions 306a–306n to the synthesizing portion 309 (Step 510). No information is output from the loop-back selecting portions if a loop-back command is absent.

Each of steps 506 to 510 is simultaneously performed or sequentially repeated on n band-components. On completion of the above-mentioned steps (506–510) on all frequency-bands, the synthesizing portion 309 synthesizes the frequency-band-components of the decoded prediction-error signal from the loop-back selecting portions 308a to 308n into a decoded prediction-error signal that is then transferred to the adding portion 310 (Step 511).

The adding portion 310 produces a decoded image signal by adding the prediction-error signal outputted at Step 502 to the prediction-error signal outputted at Step 511. The decoded image signal is stored in the frame memory portion 302 (Step 512) and will be used when encoding a subsequent input image signal.

Steps 501 to 512 are repeated until the last input image signal is encoded (Step 513). The processing is then finished.

Referring to FIGS. 6A and 6B, the method of sending a loop-back command for each frequency-band by the loop-back control portion 307 is described below in detail.

FIG. 6A illustrates how to stop evenly and periodically sending a loop-back command for respective frequency-bands. The loop-back of every frequency-band-component can be thus periodically stopped, preventing propagation of an error if an unpredictable transmission error and a loss of information occurred.

It is also possible to control a loop-back command rate for each frequency band. FIG. 6B depicts, by way of example, a loop-back control method that maintains a minimum necessary apparent quality of a decoded image by increasing the low-band loop-back rate and decreasing the high-band loop-back rate because a low-band decoding error may have a considerable influence on the quality of the decoded image in appearance. As mentioned above, the loop-back control portion 307 can send a loop-back command for separately looping-back each of the frequency bands, so it can realize a variety of looping-back patterns.

Figure 7:
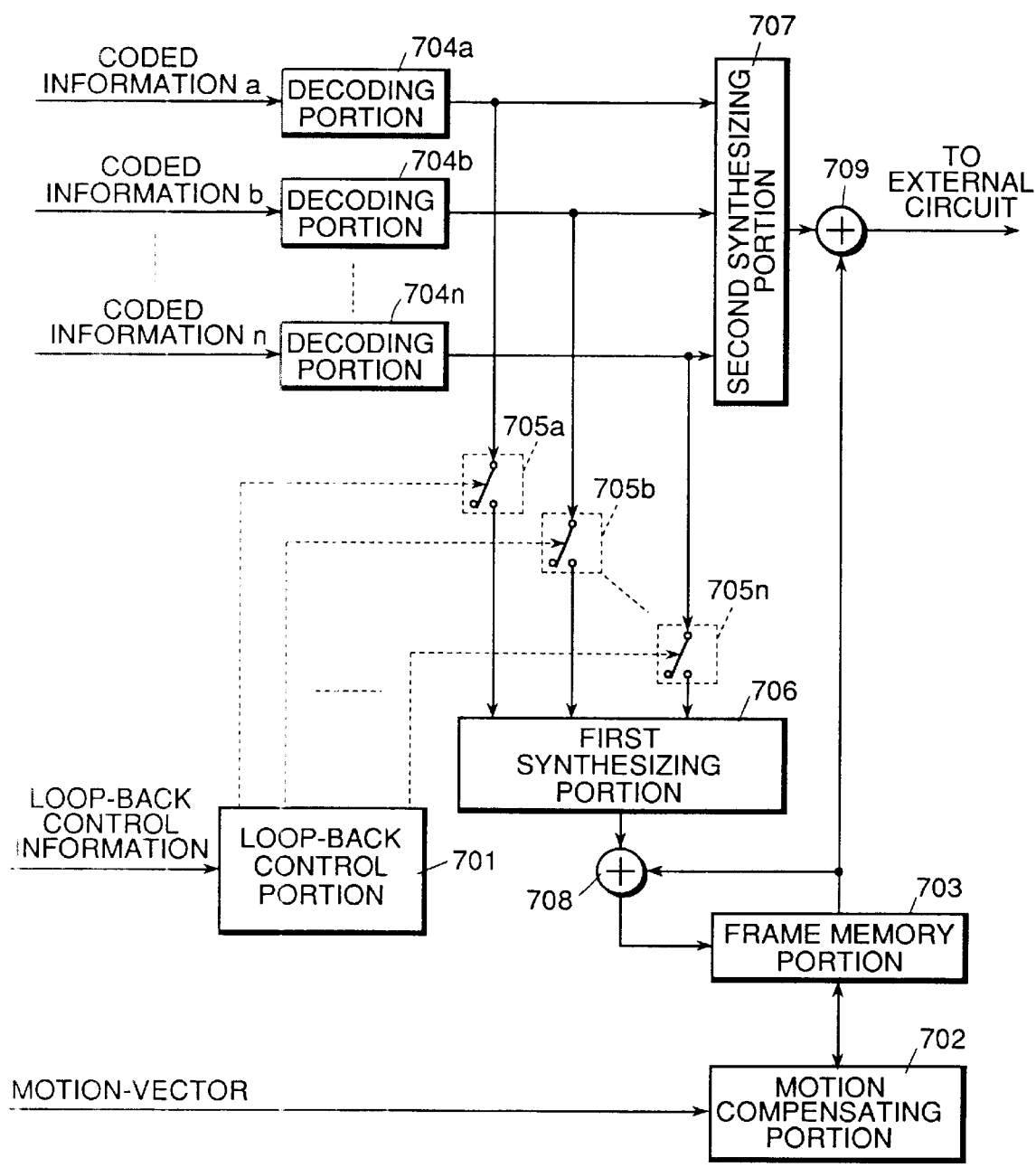
FIG. 7 is a construction block-diagram of a video decoding device provided with hierarchical loop-back control means, which device is another embodiment of the present invention.

Referring to FIG. 7, a hierarchical video-decoding device embodying the present invention will be described below:

As shown in FIG. 7, this embodiment of the present invention comprises a loop-back control portion 701, a motion-compensating portion 702, a frame memory portion 703, decoding portions 704a to 704n, loop-back selecting portion 707a to 705n, a first synthesizing portion 706, a second synthesizing portion 707, a first adding portion 708 and a second adding portion 709.

The above-mentioned portions will be described below in detail.

The loop-back control portion 701 decides a frequency band to be loop-back controlled according to a loop-back control information from an external circuit and give a loop-back command to corresponding loop-back selecting portion (705a to 705n), which corresponds to the designated loop-controllable frequency band.

The motion-compensating portion 702 performs motion-compensating processing by using motion-vectors received from an external circuit and reads a predicted image signal from the frame memory portion 703. In the frame memory portion 703, there is stored a preceding image signal that was decoded.

The decoding portions 704a to 704n decode coded information a–n respectively and output respective frequency-band components of the decoded prediction-error signal.

The loop-back selecting portion 705a to 705n transfers the decoded frequency-band components of the decoded prediction-error signal to the first synthesizing portion 706 when detected a loop-back command. No information is output when no command was detected.

The first synthesizing portion 706 synthesizes respective frequency-band components of the decoded prediction-error signal and outputs respective decoded prediction-error signals.

The second synthesizing portion 707 synthesizes all of the decoded prediction-error signals and outputs a decoded prediction-error signal.

The first adding portion 708 adds the predicted image signal to the decoded prediction-error signal outputted from the first synthesizing portion 706 and outputs a decoded image signal.

The second adding portion 709 adds the predicted image signal to the decoded prediction-error signal outputted from the second synthesizing portion 707 and outputs a decoded image signal.

Figure 8:
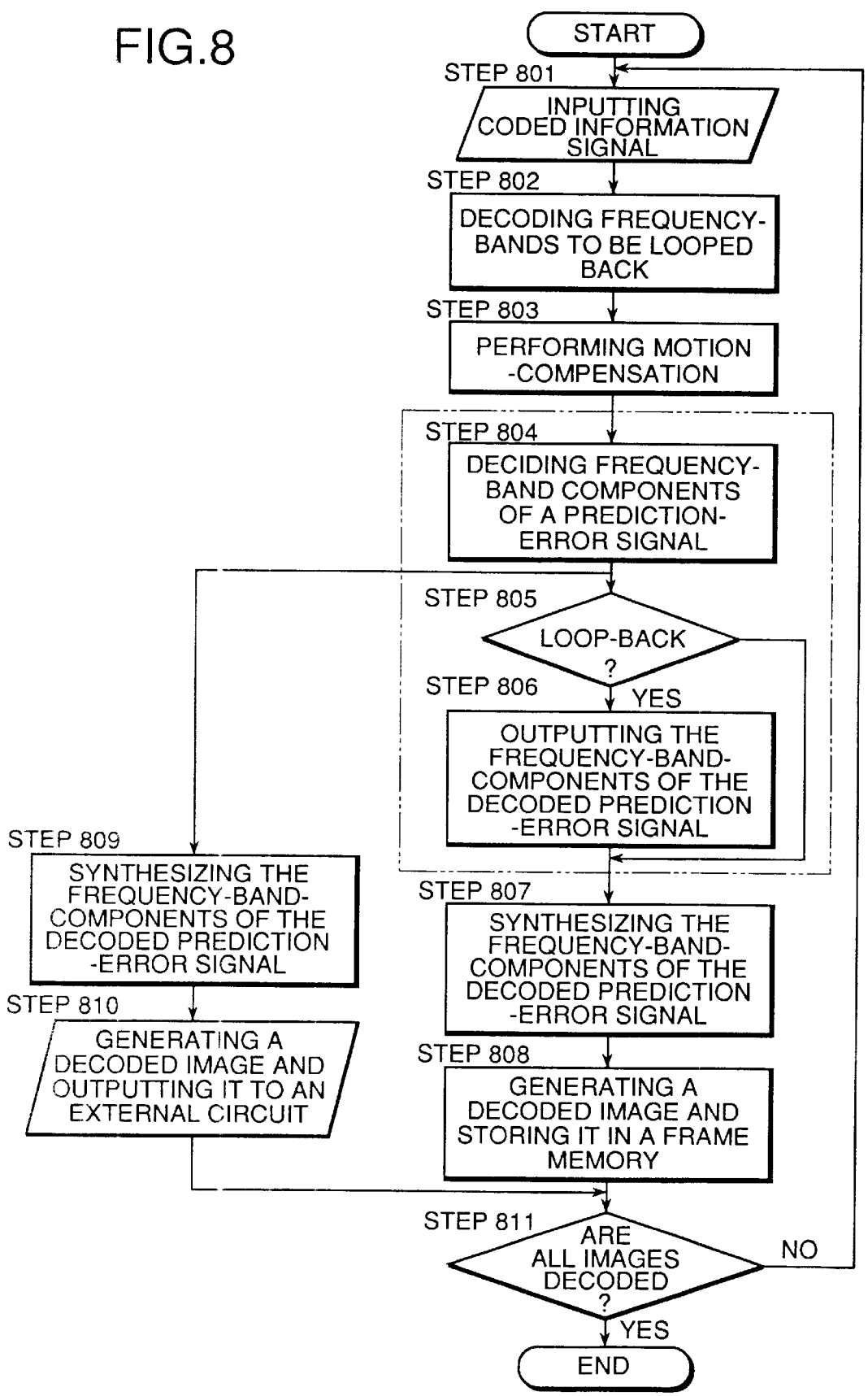
FIG. 8 is a flow chart for explaining a sequence of processing by the video decoding device according to the embodiment shown in FIG. 7.

Referring to FIG. 8, the sequential operation of the video decoding device of FIG. 7 is described below.

When hierarchically encoded information, loop-back information and motion vectors are inputted (Step 801), the loop-back control portion 701 reads the loop-back information, decides bands to be loop-back controlled and transmits a loop-back command to loop-back selecting portions 705a to 705n that correspond to the designated bands (Step 802).

On receipt of the motion-vectors, the motion-compensating portion 702 reads a predicted image signal from the frame-memory portion 703 and transfers the read-out signal to the first adding portion 708 and the second adding portion 709 (Step 803).

The decoding portions 704a to 704n decode the coded information a–n and output frequency-band-components of the coded prediction-error signals to the corresponding loop-back selecting portions 705a to 705n (Step 804).

The loop-back selecting portions 705a to 705n detect the presence of a loop-back command from the loop-back control portion 701 (Step 805).

Having detected the loop-back command from the loop-back control portion 701 (Step 805), the loop-back selecting portions 705a to 705n transfer the frequency-band components of the decoded prediction-error signals from the decoding portion 704a–704n to the first synthesizing portion 706 (Step 806). Nothing is outputted from the loop-back selecting portions when no loop-back command was detected.

Each of the steps 804 to 806 (a part enclosed with a two-dot chain line) is simultaneously performed on respective frequency-bands or subsequently repeated on the number of frequency-bands. On completion of the above-mentioned operations 804 to 806 on all frequency bands, the first synthesizing portion 706 synthesizes a decoded image signal from frequency-band-components outputted from the loop-back selecting portions 705a to 705n and outputs the decoded prediction error signal to the first adding portion 708 (Step 807).

The first adding portion 708 adds the predicted image signal outputted at Step 803 to the decoded prediction-error signal outputted at Step 807 to produce a decoded image signal that is then stored in the frame memory portion 703 to be used for decoding subsequent information hierarchically encoded (Step 808).

On the other hand, all frequency-band components of the decoded prediction-error signals outputted at Step 804 are also sent to the second synthesizing portion 707 whereby they are synthesized to a decoded prediction-error signal and transferred to the second adding portion 709 (Step 809).

The second adding portion 709 adds the predicted image signal outputted at Step 803 to the decoded prediction-error signal outputted at Step 809 to produce a decoded image signal that is then output to the external circuit (Step 810).

Steps 801 to 810 are repeated until the last coded information is decoded (Step 811). The processing procedure is finished.

Referring to accompanying drawings, another video-coding device and another video decoding device according to the present invention will be described below in detail.

Figure 9:
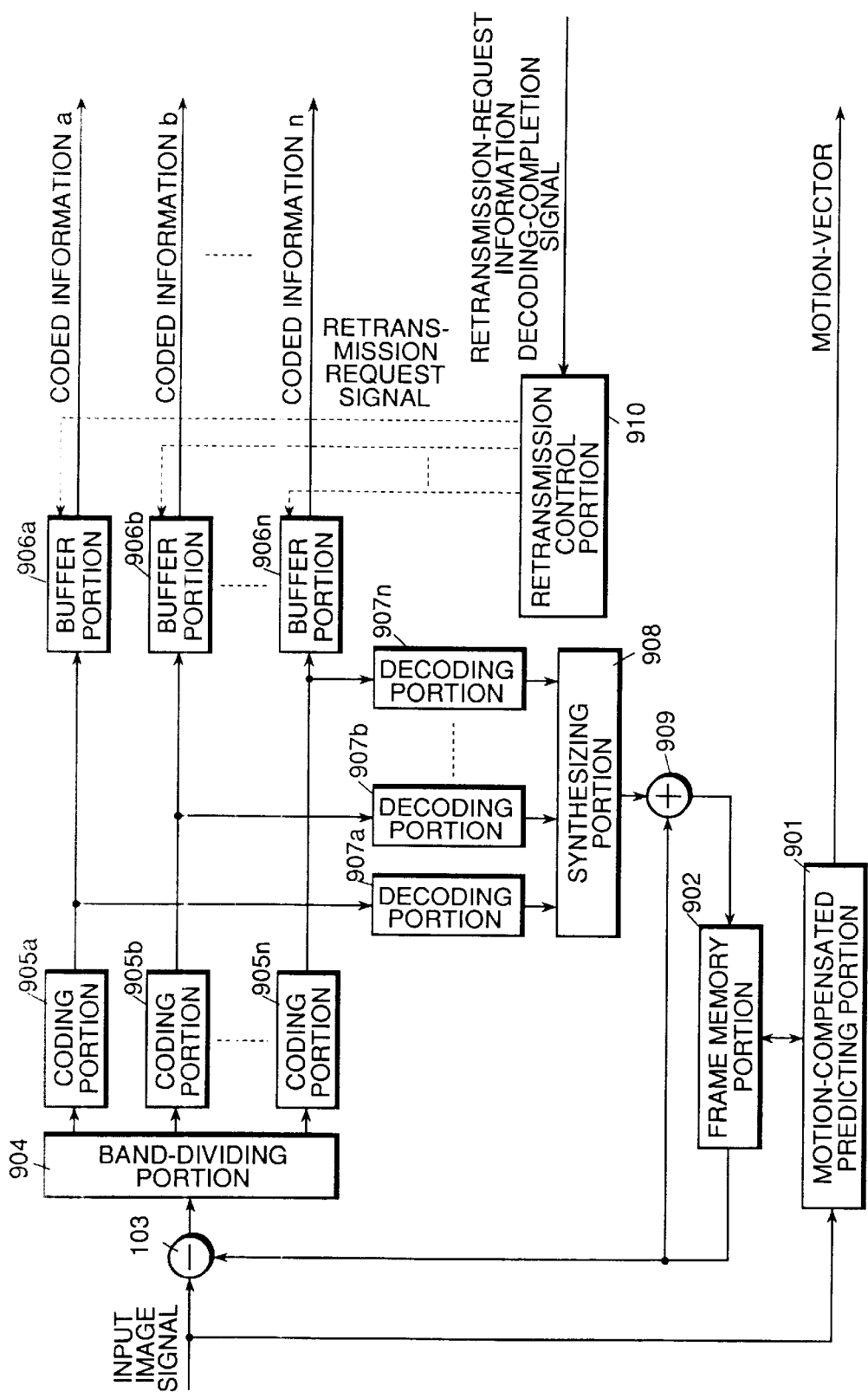
FIG. 9 is a construction block-diagram of a video coding device provided with hierarchical retransmission control means according to the present invention.

FIG. 9 depicts a video coding device provided with hierarchical retransmission-control means according to the present invention.

As shown in FIG. 9, this embodiment comprises a motion-compensated interframe-predicting portion 901, a frame memory portion 902, a difference calculating. portion 903, a band-dividing portion 904, coding portions 905a to 905n, buffer portions 906a to 906n, decoding portions 907a to 907n, a synthesizing portion 908, an adding portion 909 and retransmission control portion 910.

The above-mentioned portions of the embodiment according to the present invention are described below in detail.

The motion-compensated interframe-predicting portion 901 performs motion-compensated prediction of the input image signal by reference to the preceding image signal that was coded, decoded and stored in the frame memory portion 902. This motion-compensated predicting portion 901 outputs motion vectors as a result and reads a predicted image signal from the frame memory portion 902.

The frame memory portion 902 stores an image signal coded and decoded just before the current input image signal.

The difference calculating portion 903 determines a difference between the input image signal and the predicted signal read from the frame memory portion 902 and outputs the result as a prediction error signal to the band-dividing portion 904.

The band-dividing portion 904 divides the prediction-error signal output from the difference calculating portion 903 into n pieces of frequency-band-components and outputs the frequency-band-components one to by one corresponding coding portions 905a to 905n.

The coding portions 905a to 905n receive the corresponding frequency-band-components of the predicted error signal from the band-dividing portion 904, quantize and encode the received frequency-band-components and output coded signals a–n of the respective frequency bands.

The buffer portions 906a to 906n store the coded information output from the coding portions 905a to 905n and output them to the external circuit. With a retransmission request signal received from the retransmission control portion 910, the buffer portions also output the necessary coded information of the requested frequency-band components.

The decoding portions 907a to 907n decode the respective coded signals outputted from the coding portions 905a to 905n and output respective decoded frequency-band-component signals of the prediction-error signal.

The synthesizing portion 908 synthesizes the frequency-band-components of the decoded prediction-error signal outputted from the decoding portions 907a to 907n and outputs the decoded prediction-error signal.

The adding portion 909 adds respective decoded prediction-error signal outputted from the synthesizing portion 908 to the predicted-image signal output from the frame memory portion 902 and generates a decoded image signal.

The retransmission control portion 910 receives a hierarchical retransmission request from the external circuit and outputs a request command to respective buffer portions 906a–906n corresponding to the requested frequency-bands.

FIG. 4 depicts also an embodiment of the band-dividing portion 904 of FIG. 9. A part (A) of FIG. 4 shows an example of the circuit construction of the band-dividing portion 904 and a part (B) of FIG. 4 shows a method of dividing a prediction-error signal into frequency-band-components. In the part (A) of FIG. 4, letters LF and HF denote a low-pass filter and high-pass filter respectively.

In the part (B) of FIG. 4, an input signal (b-1) is divided first into 4 frequency bands (b-2), two in the horizontal direction and two in the vertical direction, and the lowest band is similarly divided into 4 bands. Namely, the signal is divided into 7 frequency-bands (b-3). Arrows (↧) indicate the correlation between the part (A) of FIG. 4 and the part (B) of FIG. 4.

Figure 10:
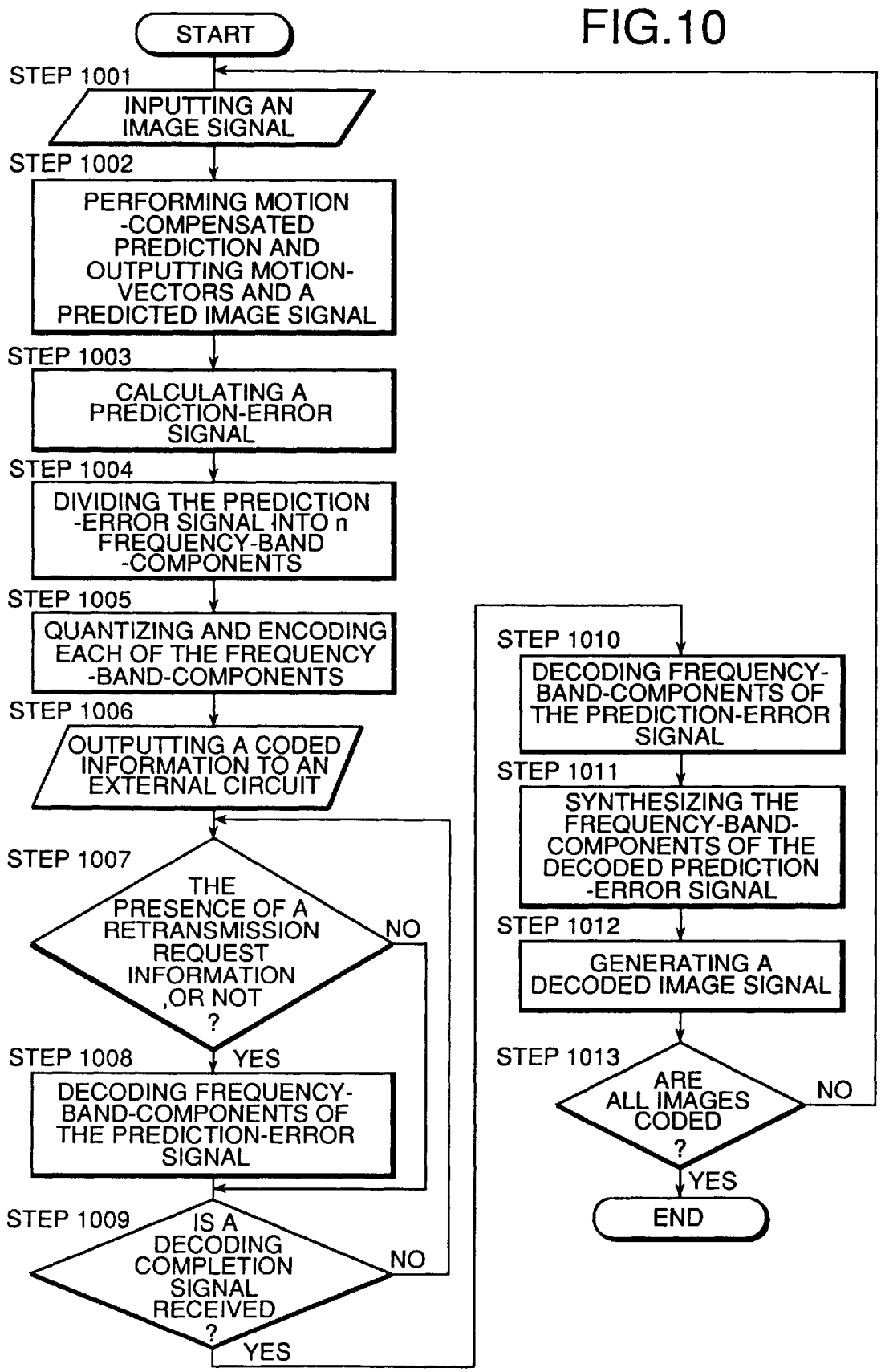
FIG. 10 is a flow chart for explaining a sequence of processing by the video coding device according to the embodiment (FIG. 9) of the present invention.

Referring to FIG. 10, the operation of the video coding device of FIG. 9 according to one aspect of the present invention is described below.

When an image signal is inputted (at Step 1001), the motion-compensated predicting portion 901 performs motion-compensated interframe-prediction of the input image signal by reference to a preceding image signal that was coded, decoded and stored in the frame memory portion 902, and outputs motion-vectors to an external circuit and a predicted image signal to the difference calculating portion 903 and the adding portion 909 respectively (Step 1002).

A difference between the input image signal and the predicted image signal read from the frame memory portion 902 is determined by the difference calculating portion 903 and output as a prediction error signal to the band-dividing portion 904 (Step 1063).

This prediction error signal is divided by the band-dividing portion 904 into n pieces of frequency-band-components that are then transferred to corresponding coding portions 905a to 905n (Step 1004).

The coding portions 905a to 905n quantize and encode respective frequency-band-components of the prediction error, which were outputted from the band-dividing portion 904 (Step 1005) to the corresponding buffer portions 906a to 906n. The coded information of respective frequency-band components is then outputted to the hierarchical video-decoding device (Step 1006).

When a retransmission-request information from the video-decoding device according to the present invention arrives (Step 1007), the retransmission-control portion 910 outputs a retransmission request signal to the corresponding buffers 906a–906n for the requested frequency-band components according to the received information.

Having received the retransmission-request signal from the retransmission-control portion 910, the buffer portions (906a–906n) output respective coded information to the video-decoding device (Step 1008). Steps 1007 to 1008 are repeated until a decoding-operation completion signal from the video-decoding device according to the present invention arrives (Step 1009).

On the other hand, the coded information of respective frequency-band components from the coding portions 905a to 905n is also transferred to the decoding portions 907a to 907n that in turn decode the received coded information and output the frequency-band-components of the decoded prediction-error signal to the synthesizing portion 908 (Step 1010).

The synthesizing portion 908 synthesizes the frequency-band-components of the decoded prediction-error signal from the decoding portions 907a to 907n into a decoded prediction-error signal that is than transferred to the adding portion 909 (Step 1011).

The adding portion 909 produces a decoded image signal by adding the prediction-error signal outputted at Step 1002 to the prediction-error signal outputted at Step 1011. The decoded image signal is stored in the frame memory portion 102 (Step 1012) and will be used for performing motion-compensated interframe-prediction when encoding a subsequent input image signal.

Steps 1001 to 1012 are repeated until the last input image signal is encoded (Step 1013). The processing is then finished.

Figure 11:
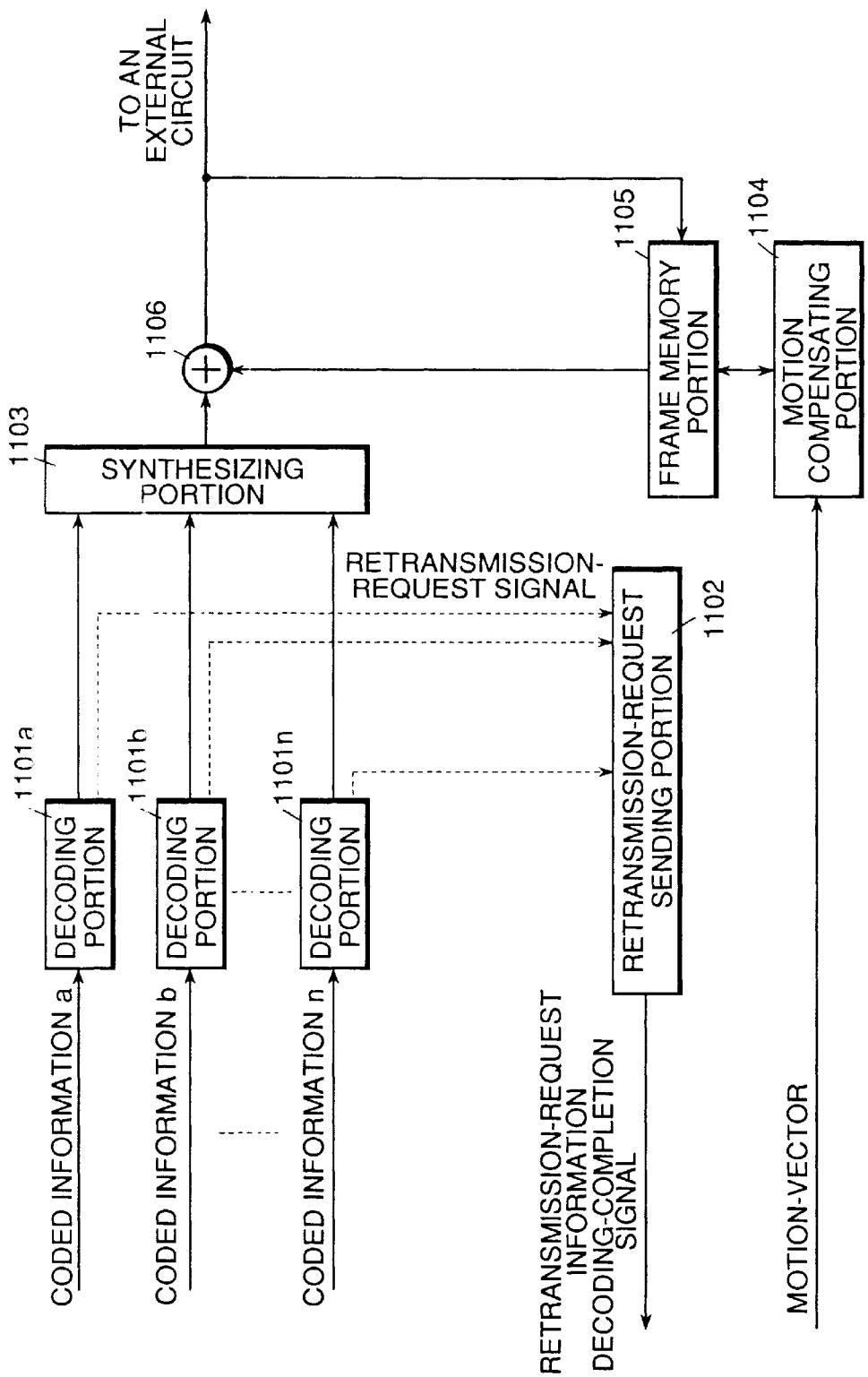
FIG. 11 is a construction block-diagram of a video decoding device provided with hierarchical retransmission-request control means according to the present invention.

Referring to FIG. 11, another hierarchical video-decoding device embodying the present invention will be described below:

As shown in FIG. 11, this embodiment of the present invention comprises decoding portions 1101a to 1101n, a retransmission-request sending portion 1102, a synthesizing portion 1103, a motion-compensating portion 1104, a frame memory portion 1105 and an adding portion 1106.

The above-mentioned portions will be described below in detail.

The decoding portions 1101a to 1101n decode coded information a–n respectively and output respective frequency-band components of the decoded prediction-error signal. The decoding portions 1101a to 1101n output a retransmission-request signal to the retransmission-request sending portion 1102 when the coded information could not normally be decoded due to a decoding error.

The retransmission-request sending portion 1102 transfers all the retransmission-request signals received from the decoding portions 1101a to 1101n as hierarchical-layer retransmission-request to the video-coding device according to the present invention. On completion of normally decoding all frequency-band components, the retransmission-request sending portion 1102 sends the decoding-completion signal to the video-coding device.

The motion-compensating portion 1104 performs motion-compensating processing by using motion-vectors received from an external circuit and reads a predicted image signal from the frame memory 1105. In the frame memory portion 1105, there is stored a preceding image signal that was decoded.

The synthesizing portion 1106 synthesizes respective frequency-band components of the decoded prediction-error signal and outputs a decoded prediction-error signal.

The adding portion 1106 adds the predicted image signal read from the frame-memory portion 1105 to the decoded prediction-error signal output from the synthesizing portion 1103 and outputs a decoded image signal.

Figure 12:
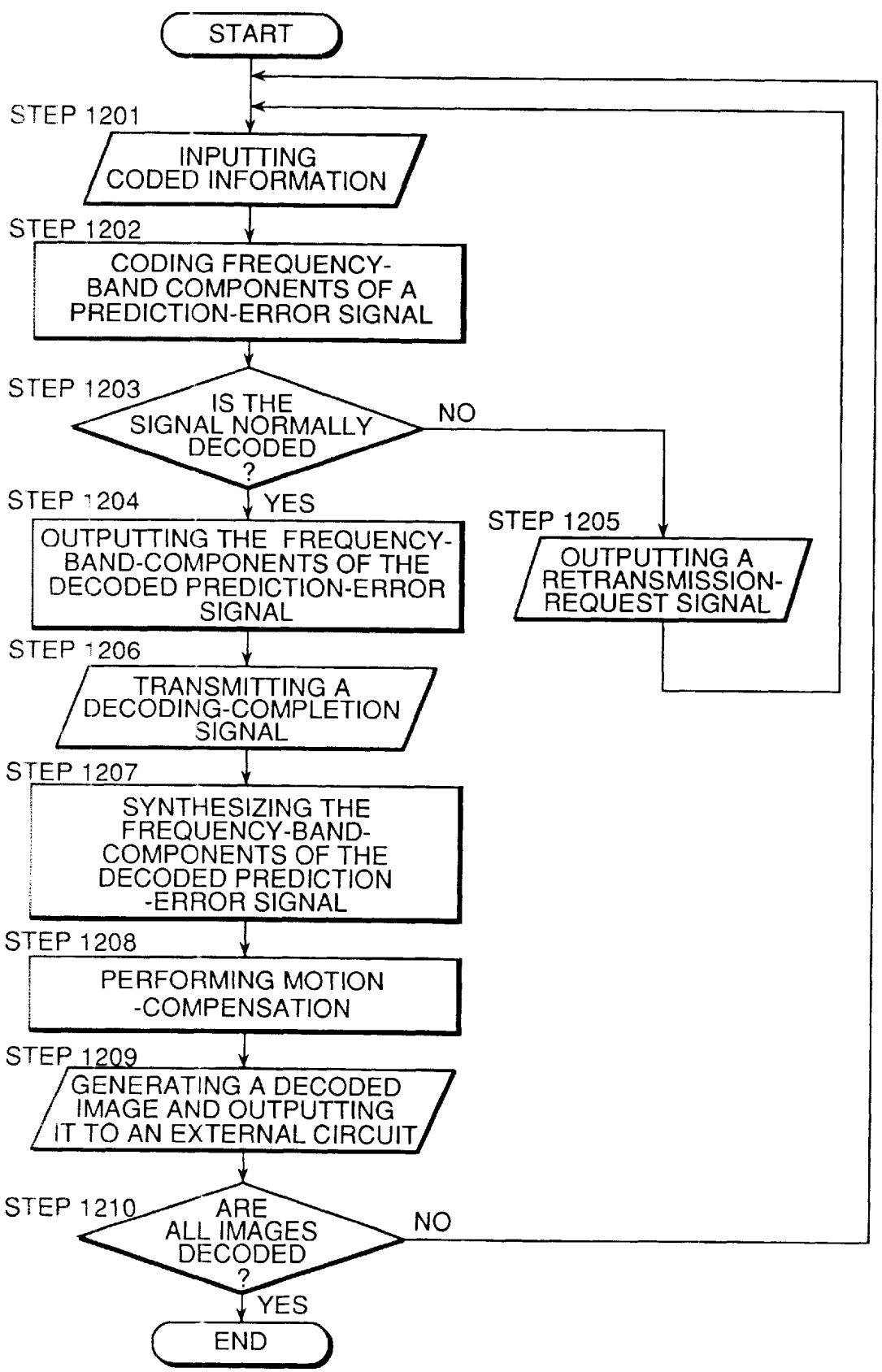
FIG. 12 is a flow chart for explaining a sequence of processing by the video decoding device according to the embodiment shown in FIG. 11.

Referring to FIG. 12, the sequential operation of the video decoding device of FIG. 11 is described below.

When hierarchical layers a–n of the encoded information and motion vectors are input (Step 1201), decoding portions 1101a to 1101n decode the corresponding layers a–n of the coded information (Step 1202). When the frequency-band-components of the coded prediction-error signals are normally decoded (Step 1103), the decoded signals are transferred to the synthesizing portion 1103 (Step 1204). If the coded information could not normally be decoded, the decoding portions 1101a to 1101n output respective retransmission-request signals to the retransmission-request sending portion 1102 that in turn transmits the signals as the retransmission-request information to the video-coding device according to the present invention (Step 1205).

On receipt of the retransmission-request information, the video-coding device retransmits the coded information of the corresponding frequency-bands. The processing returns to Step 1201.

Steps 1201 to 1205 are repeated until all the frequency band-components are decoded. The decoding-completion signal is then sent from the retransmission-request sending portion 1102 to the video-coding device according to the present invention (Step 1206).

The synthesizing portion 1103 synthesizes the frequency-band-components of the decoded prediction-error signal from the decoding portions 1101a to 1101n into a decoded prediction-error signal that is then transferred to the adding portion 1106 (Step 1207).

On the other hand, the motion-compensating portion 1104 performs the motion-compensating processing according to the received motion-vector information, reads a predicted image signal from the frame-memory portion 1105 and transfers the readout signal to the adding portion 1106 (Step 1208).

The adding portion 1106 adds the predicted image signal outputted at Step 1208 to the decoded prediction-error signal outputted at Step 1207 to produce a decoded image signal that is then outputted to the external circuit and, at the same time, stored in the frame memory portion 1205 to be used for decoding subsequent coded information (Step 1209).

Steps 1201 to 1210 are repeated until the last input image signal is encoded (Step 1211). The processing is then finished.

As described herein, following advantageous effects are brought according to the present invention.

(1) In one advantageous effect of the present invention, a video coding device provided with hierarchical loop-back control means can control the execution or non-execution of loop-back for each of frequency bands, thus effectively preventing propagation of any decoding error to a subsequent frame to be predicted by motion-compensated inter-frame prediction.

(2) In another advantageous effect of the present invention, a video coding device provided with hierarchical control means can realize the effects of (1) mentioned above and can separately control the selection of either execution or non-execution of looping-back for each of frequency bands, thus effectively preventing propagation of any decoding error to a subsequent frame.

(3) In still another advantageous effect of the present invention, a video coding device provided with hierarchical loop-back control means can realize the effects of (1) and (2) mentioned above and can also periodically stop the execution of loop-back for each of frequency bands, thus periodically eliminating propagation of any decoding error occurred in any frequency band to a subsequent image to be decoded.

(4) In a further advantageous effect of the present invention, a video coding device provided with hierarchical loop-back control means can realize the effects of (1) to (3) mentioned above and can adaptively control a loop-back rate for each of the frequency bands, so realizing the effective loop-back for preventing propagation of any decoding error to a subsequent image and for improving coding efficiency of video sequence by increasing loop-back rate of low-frequency bands.

(5) In one advantageous effect of a video decoding device of the present invention, a video decoding device provided with hierarchical loop-back control means can separately control the execution or non-execution of loop-back for each of the frequency bands, thus effectively preventing propagation of any decoding error to a subsequent decodable image.

(6) In a further advantageous effect of a video decoding device of the present invention, a video decoding device provided with hierarchical loop-back control means can realize the effect of (5) mentioned above and can adaptively control the execution or non-execution of loop-back for each of the frequency bands by using transmitted loop-back information on coded signal, thus attaining the improved performance of the device.

(7) In one advantageous effect of the present invention, a video coding device provided with hierarchical retransmission control means can switch whether to execute retransmission of coded information for each frequency band component, thus effectively conducting retransmission of the coded information.

(8) In another advantageous effect of the present invention, a video coding device provided with hierarchical retransmission control means can realize the effect of (7) mentioned above and can individually control changing-over of the retransmission of coded information for each frequency band, thus effectively executing retransmission of the necessary coded information.

(9) In another advantageous effect of a video decoding device of the present invention, a video decoding device provided with hierarchical retransmission-request control means can switch whether to send a request retransmission of coded information for each of the frequency bands, thus realizing effective retransmission of the coded information from the video-coding device.

(10) In a further advantageous effect of a video decoding device of the present invention, a video decoding device provided with hierarchical retransmission-request control means can realize the effect of (8) mentioned above and can individually control switching-over of sending the retransmission-request for each frequency-band, thus realizing effective retransmission of the coded information from the video-coding device.

We claim:

1. A video coding device for hierarchically encoding a video image sequence by obtaining prediction-error signals between an input object image frame and a predicted image frame provided through performing motion-compensated interframe-prediction of a digital video image signal, dividing the prediction-error signals into predetermined frequency-band-components, hierarchically encoding the frequency-band-components one by one and outputting a coded signal to be transmitted and, at the same time, decoding the coded components one by one, generating a decoded image frame from the decoded prediction error signal and the predicted frame and looping-back the decoded image frame to be used for motion-compensated interframe-prediction of a subsequent image, wherein hierarchical loop-back control means is provided for selecting execution or non-execution of looping-back for each of the frequency-band components.

2. A video-coding device as defined in claim 1, wherein the hierarchical loop-back control means independently controls changing-over of execution or non-execution of looping-back for each frequency band.

3. A video-coding device as defined in claim 1, wherein the hierarchical loop-back control means periodically and evenly stops looping-back for every frequency band component for preventing propagation of an unpredictable decoding error to a subsequent decodable image.

4. A video-coding device as defined in claim 1, wherein the hierarchical loop-back control means adaptively controls looping-back of frequency bands by increasing the loop-back rate for lower frequency bands and decreasing loop-back rate for higher frequency bands to prevent decreasing of coding efficiency.

5. A video-decoding device for decoding coded signals by a hierarchical coding method, which obtains decoded prediction-error signals by decoding coded prediction-error signals of predetermined frequency-band components, said coded prediction-error signals provided by obtaining a prediction-error signal through performing motion-compensated interframe-prediction, dividing the prediction-error signal into predetermined frequency-band-components and encoding the frequency-band-components, obtains decoded prediction-side-information by decoding coded-prediction-side-information on the motion-compensated interframe-prediction, generates a decoded image-frame from the prediction-side-information and a reference predicted image-frame and generates a decoded video image signal from the decoded predicted image-frame and the coded prediction-error signals, wherein a hierarchical loop-back means is provided for obtaining the reference predicted image-frame used for obtaining the decoded predicted image-frame and is capable of individually selecting execution or non-execution of looping-back for each of the frequency-band components.

6. A video-decoding device for decoding coded signals by a hierarchical coding method as defined in claim 5, wherein the hierarchical loop-back means is capable of individually selecting execution or non-execution of looping-back for each of the frequency-band components according to loop-back control information transmitted from a coding device for decoding the coded signals using the hierarchical coding method.

7. A video coding device for hierarchically encoding a video sequence by obtaining prediction-error signals between an input object image frame and a predicted image frame provided through performing motion-compensated interframe-prediction of a digital video signal, dividing the prediction-error signals into predetermined frequency-band-components, hierarchically encoding the frequency-band-components one by one and outputting a coded signal to be transmitted, wherein hierarchical retransmission control means is provided for switching from retransmitting to non-retransmitting the coded information and vice versa for each of the frequency-band components.

8. A video coding device as defined in claim 7, wherein the hierarchical retransmission control means independently controls changing-over of retransmission or non-retransmission of the coded information in each frequency band.

9. A video-decoding device for decoding coded signals by a hierarchical coding method, which obtains decoded prediction-error signals by decoding coded prediction-error signals of predetermined frequency-band components, said coded prediction-error signals previously provided by obtaining a prediction-error signal through performing motion-compensated interframe-prediction, dividing the prediction-error signal into predetermined frequency-band components and encoding the frequency-band components, obtains a decoded prediction-side-information by decoding coded information signals coming on including coded prediction-side-information on the motion-compensated interframe-prediction, generates a decoded image-frame from the prediction-side-information and a reference predicted image-frame and generates a decoded video image signal from the decoded predicted image frame and the decoded prediction-error signals, wherein a retransmission-request control means is provided for switching a retransmission-request for the coded information signal including each frequency band of the prediction-error signal either to be sent or not for each frequency-band.

10. A video decoding device for decoding hierarchically coded information as defined in claim 9, wherein the retransmission-request control means individually controls changing-over sending the retransmission-request for the coded information for each frequency-band.

* * * * *